United States Patent
Cook et al.

(10) Patent No.: US 11,497,162 B2
(45) Date of Patent: Nov. 15, 2022

(54) PIVOTING ACTION LOW PROFILE SICKLE DRIVE

(71) Applicant: CNH Industrial America LLC, New Holland, PA (US)

(72) Inventors: Joel T. Cook, Lititz, PA (US); Gary L. Bich, New Holland, PA (US); David M. DeChristopher, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 866 days.

(21) Appl. No.: 16/356,931

(22) Filed: Mar. 18, 2019

(65) Prior Publication Data

US 2019/0208701 A1    Jul. 11, 2019

Related U.S. Application Data

(63) Continuation of application No. 15/612,396, filed on Jun. 2, 2017, now Pat. No. 10,653,059, which is a continuation of application No. 14/127,852, filed as application No. PCT/US2012/039749 on May 25, 2012, now Pat. No. 9,668,407.

(60) Provisional application No. 61/491,002, filed on May 27, 2011.

(51) Int. Cl.
*A01D 34/02* (2006.01)
*A01D 34/14* (2006.01)
*A01D 34/30* (2006.01)

(52) U.S. Cl.
CPC ........... *A01D 34/02* (2013.01); *A01D 34/145* (2013.01); *A01D 34/30* (2013.01)

(58) Field of Classification Search
CPC ....... A01D 34/02; A01D 34/145; A01D 34/30
See application file for complete search history.

(56) References Cited

U.S. PATENT DOCUMENTS

| | | | |
|---|---|---|---|
| 385,272 | A | 6/1888 | Johnson |
| 779,429 | A | 1/1905 | Kunkle |
| 944,712 | A | 12/1909 | Berens |
| 1,423,999 | A | 7/1922 | Campbell |

(Continued)

FOREIGN PATENT DOCUMENTS

| | | |
|---|---|---|
| CN | 201467690 | 5/2010 |
| DE | 4319409 A1 | 3/1994 |

(Continued)

*Primary Examiner* — Abigail A Risic
(74) *Attorney, Agent, or Firm* — Peter Zacharias; Patrick Sheldrake

(57) ABSTRACT

The pivoting action sickle drive has a low profile allowing incorporation in or below a floor of a header of a plant cutting machine to allow passage of cut plant material thereabout. The drive includes a substantially flat rotatable input element, and a drive arm connected eccentric thereto for eccentric rotation along an epicyclical path. The arm extends to a connection with a pivot arm of a pivot element that connects to a knife arm that drives a sickle knife assembly, such that the pivot element, knife arm and knife assembly will be reciprocatingly driven by the eccentric rotation of the drive arm. A second drive can oppositely drive a second sickle knife assembly, such that opposite forces generated by the drives will cancel. The drives can be packaged in a forwardly tapered or curved enclosure, and the pivot elements can be correspondingly shaped to streamline the drives.

24 Claims, 10 Drawing Sheets

(56) References Cited

U.S. PATENT DOCUMENTS

| | | | |
|---|---|---|---|
| 2,269,774 | A | 1/1942 | Lawrence |
| 2,515,343 | A | 7/1950 | Gravely |
| 2,942,483 | A | 6/1960 | Evans et al. |
| 3,508,388 | A | 4/1970 | Buchholz |
| 3,517,494 | A | 6/1970 | Beusink et al. |
| 4,067,179 | A | 1/1978 | Schneider |
| 4,866,921 | A * | 9/1989 | Nagashima ............ A01D 34/30 56/DIG. 17 |
| 4,909,025 | A | 3/1990 | Reissig et al. |
| 5,497,605 | A | 3/1996 | Underwood et al. |
| 6,698,177 | B1 | 3/2004 | Akehi et al. |
| 6,889,492 | B1 * | 5/2005 | Polk ................... A01D 41/142 56/257 |
| 7,401,458 | B2 | 7/2008 | Priepke |
| 7,520,118 | B1 | 4/2009 | Priepke |
| 7,730,709 | B2 | 6/2010 | Priepke |
| 7,805,919 | B2 | 10/2010 | Priepke |
| 7,810,304 | B2 | 10/2010 | Priepke |
| 7,836,671 | B2 | 11/2010 | Sauerwein et al. |
| 8,011,272 | B1 * | 9/2011 | Bich .................... A01D 34/305 74/595 |
| 8,151,547 | B2 | 4/2012 | Bich et al. |
| 9,668,407 | B2 | 6/2017 | Cook et al. |
| 10,827,673 | B2 * | 11/2020 | Cook ..................... A01D 69/06 |
| 2009/0145264 | A1 * | 6/2009 | Priepke ................ A01D 34/30 56/259 |
| 2011/0099964 | A1 | 5/2011 | Coers et al. |
| 2014/0130472 | A1 | 5/2014 | Cook et al. |
| 2014/0318094 | A1 | 10/2014 | Cook et al. |
| 2020/0260641 | A1 * | 8/2020 | Schmidt ................ A01D 34/14 |
| 2020/0337233 | A1 * | 10/2020 | Groves ................. A01D 41/141 |

FOREIGN PATENT DOCUMENTS

| | | |
|---|---|---|
| DE | 19524039 A1 | 1/1997 |
| GB | 1222774 | 2/1971 |
| GB | 2166033 A | 4/1986 |
| RU | 2390120 C2 | 5/2010 |
| SU | 1704675 A1 | 1/1992 |
| WO | 2019010567 A1 | 1/2019 |

* cited by examiner

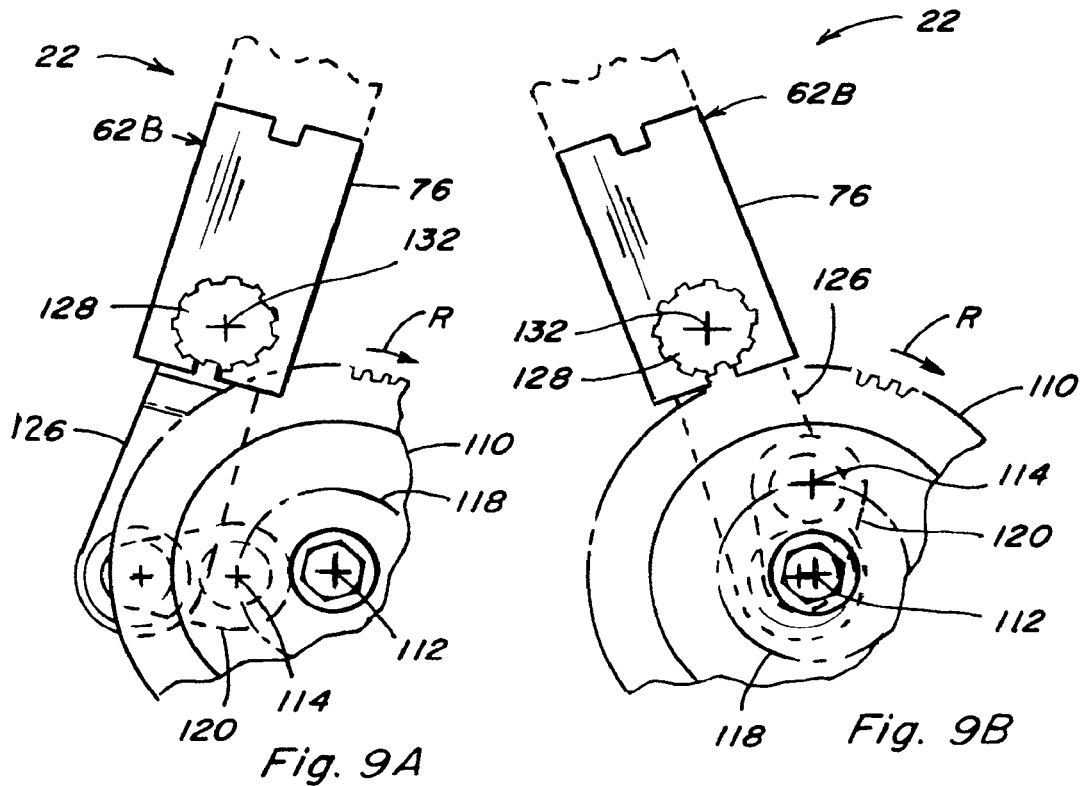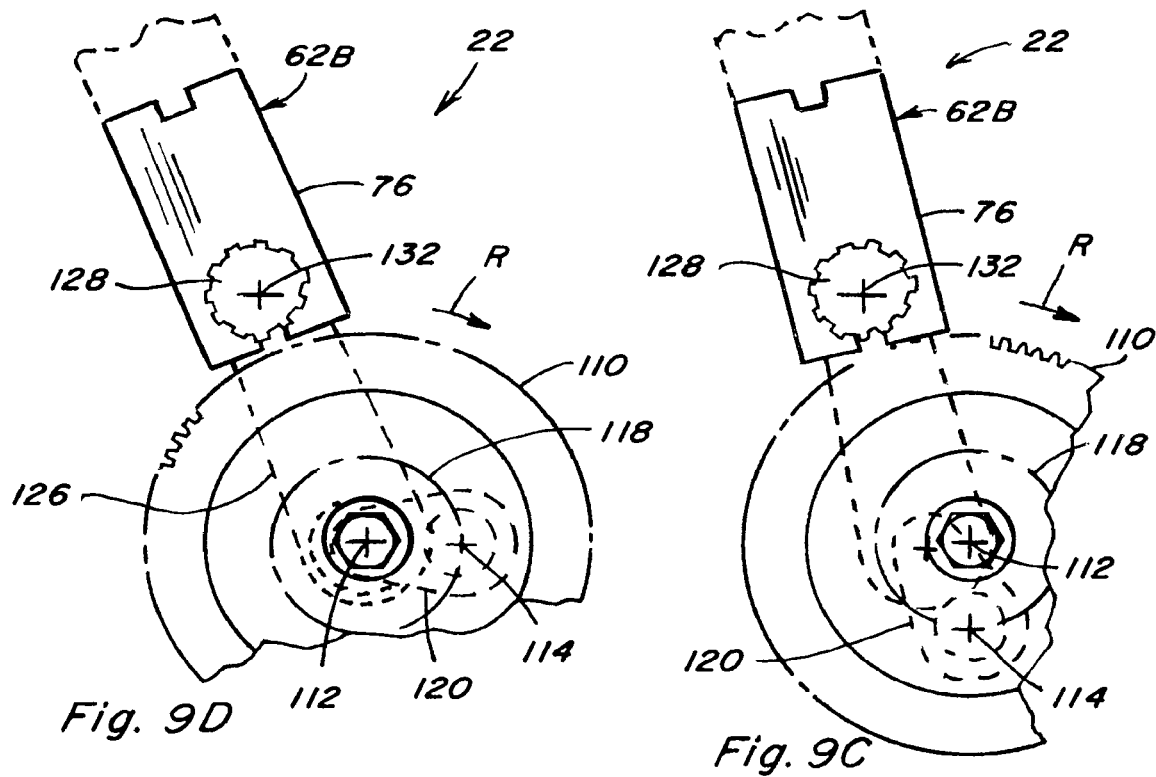

PIVOTING ACTION LOW PROFILE SICKLE DRIVE

CROSS REFERENCE TO RELATED APPLICATIONS

This application is a continuation of U.S. patent application Ser. No. 15/612,396, entitled "Pivoting Action Low Profile Sickle Drive" filed Jun. 2, 2017, which is a continuation of U.S. patent application Ser. No. 14/127,852, filed Dec. 19, 2013, now U.S. Pat. No. 9,668,407, which is the U.S. National Stage of International Application No. PCT/US12/39749, filed on May 25, 2012, which claims the benefit of U.S. Provisional Application No. 61/491,002, filed May 27, 2011 the contents of which applications are incorporated herein by reference in their entirety for all purposes.

TECHNICAL FIELD

This invention relates generally to a drive for the sickle of a header of an agricultural cutting machine, such as a combine, windrower or other crop harvesting machine, or a mower, and more particularly, to a drive mechanism configurable to have only a pivotally rotating drive shaft extending upwardly from an upper enclosure thereof for connection to a knife head, and which is configured to have a profile shape when viewed from the side that tapers convergingly toward a forward end thereof, so as to be adapted to be disposed in or below a floor or pan of the header, to reduce interference with plant material flow.

BACKGROUND ART

Sickles typically including cutter bars supporting a row of knives, have been used to cut plants, including, but not limited to, hay, grasses, small grains and the like, for many years. The knives are composed of a plurality of knife or sickle sections which are mounted in side by side relation forming an elongate metal knife assembly. The elongate knife assembly is normally supported so as to slide longitudinally along an elongate stationary bar that has forwardly projecting, spaced apart guards bolted to a structural beam. The knife assembly moves back and forth in a reciprocating movement to move the knives relative to the guards so that the leading knife edges of the knives cross over the guards or through slots in the guards. This produces a shearing or cutting action which severs plant stems and stalks or other material captured between the knives and the guards.

In a harvesting machine, such as a combine or windrower, the knife assembly and stationary bar are typically supported in connection with a cutting head or header, and are oriented so as to extend sidewardly along a forward edge portion of structure such as a floor or pan of the header, hereinafter sometimes referred to generally as the floor. The floor or pan defines the lower periphery of a cut crop or plant flow area, which can include conveying apparatus, such as one or more augers or belts, operable in cooperation with a reel in machines so equipped, for conveying the cut plant material and crops, for instance, to a feeder inlet of a combine or windrow forming apparatus of a windrower.

The knife assembly is driven reciprocatingly longitudinally by an oscillating drive, which can include, but is not limited to, an eccentric shaft on a rotating hub, a wobble drive, or a similar well known commercially available device. Such drives are typically located at the sides of the header, so as to drive the knife assembly from the end. This location is advantageous as it allows the driving point for the knife assembly to be in line with the stationary bar, provides clearances for removal of the knife assembly, and provides space for assembly of the drive. Disadvantages of the side location include that the header must include significant frame structure for supporting the drive and to withstand forces and vibrations generated thereby. The end structure or crop divider at the end of the header must also be relatively wide, to accommodate the drive and to direct adjacent standing crops therapist, and increasing the possibility of accidentally pushing down adjacent standing crops. Additionally, for headers utilizing two drives located on opposite sides of the header, it is usually desired to time the operation of the drives such that the forces and vibrations generated by the respective drives cancel one another. This typically involves relatively long mechanical drive lines connecting the two drives together, which is disadvantageous as it adds weight, cost and complexity.

A knife assembly, which will weigh from 35 to 38 pounds for a typical 20 foot wide header, typically must accelerate and decelerate two times per cycle as a result of the reciprocating movement. A typical speed for the knife assembly is up to about 16 hertz or cycles per second. Thus, it can be seen, the reciprocating motion at a high cycle per second generates high acceleration values and high deceleration values that in turn generate high forces on the structural components. These high forces can have at least two negative effects, vibration at the drive system that may be transmitted to other components of the machine, and fatigue failure of the structural components themselves. On larger headers, for instance, headers 30 feet wide and greater, two knife assemblies each equal to one-half the sideward extent of the header are often used.

Driving a knife assembly or assemblies of a header from a more central location, such as the center of the header, would provide several advantages compared to a side location. Notably among these advantages, the header structure would not be required to support heavy drive units on one or both sides, such that the structure of the header could be lighter. Long timing apparatus extending between the ends could also be eliminated. If the drive mechanism could be incorporated into a location that would not interrupt or require dividing crop or plant material flow through the crop flow area of the header, the normal crop flow of the header would not be significantly impacted. And, since the drives are not located in the ends, the end dividers can be made significantly thinner, such that the header can have a shorter overall width, would be more easily maneuverable in relation to adjacent standing crop, and danger of downing the adjacent standing crop would be reduced.

Reference Priepke U.S. Pat. Nos. 7,810,304; 7,805,919; 7,730,709; 7,520,118; and 7,401,458, and Bich U.S. Pat. No. 8,011,272, which demonstrate that a sickle drive or drives can be incorporated in or below the header floor to solve one or more of the problems set forth above in regard to end mounted drives and interruption of plant material flow in the crop flow area of the header.

What is sought is a sickle drive adapted to be incorporated into or below the floor of a header of a plant cutting or harvester to reduce interruption and splitting of plant material flow, and which overcomes one or more of the shortcomings and limitations set forth above.

SUMMARY OF THE INVENTION

What is disclosed is a sickle drive adapted to be incorporated into or below the floor of a header of a plant cutting or harvester to reduce interruption and splitting of plant material flow, and which overcomes one or more of the shortcomings and limitations set forth above.

According to a preferred aspect of the invention, the sickle drive is located at least largely in a generally flat cavity at least partially bounded by an enclosure, having a forward end, a rear end, an upper bounds and a lower bounds defining the cavity therebetween. The cavity has a forward region having a shape which tapers or curves upwardly toward the forward end such that a forward region of the cavity is smaller in vertical extent compared to a rear region thereof. A first input element is disposed in the cavity, preferably in an upper region of the cavity adjacent to the upper surface. The first input element has a disk shape and is supported for rotation about a generally upstanding first rotational axis. A first eccentric element is connected to the first input element for rotation eccentrically about the first rotational axis. The drive includes a first drive arm disposed in the cavity in generally horizontal coextensive relation to the first input element, e.g., below it, and having a first end and an opposite second end. The first end is connected to the eccentric element for rotation therewith eccentrically about the first rotational axis, the first drive arm extending laterally relative to the first rotational axis to the second end. The second end pivotally connects to a first pivot element disposed beside the first input element. The first pivot element is supported for rotation about a generally upstanding first pivotal axis, and has a first pivot arm that extends eccentrically from the pivotal axis to the drive arm. As a result, the eccentric rotation of the first eccentric element will cause the first drive arm to reciprocatingly pivot the first pivot element about the first pivotal axis in a limited manner of travel, preferably largely within the profile of the input element when viewed from above or below.

According to another preferred aspect of the invention, a first knife arm is mounted on the first pivot shaft above the enclosure and is configured for connecting to a first sickle knife assembly in a manner such that the pivotal movement of the first pivot element will reciprocatingly move the first sickle knife assembly sidewardly relative to the enclosure.

According to another preferred aspect of the invention, the input element, eccentric element and the drive arm are each relatively flat, and at least substantially vertically coextensive, for vertical compactness. A rotatable power source, which can be, for instance, a fluid or electric motor, drive shaft, belt drive, chain drive, or the like, can be connected in driving relation to the input element and mounted on the enclosure, and can have a low vertical profile or extent, such that the overall vertical profile of the drive will be minimal generally coextensive with the drive, such that the drive fits into a tapered forward region of a header, just rearward of the sickle.

According to still another preferred aspect of the invention, a second drive that will be substantially a mirror image of the first drive can oppositely drive a second sickle knife assembly, such that opposite forces generated by the drives will be canceled. As still another preferred aspect of the invention, the first drive and the second drive are connected together for joint rotation in opposite rotational directions.

The enclosure can fully contain the drive or drives, for instance, by including full upper and lower covers, or it can partially enclose the drive or drives, such that all or a portion of any of the elements are exposed. For instance, as a non-limiting example, the enclosure can include or be incorporated in or below the floor of a header of a plant cutting machine which will serve as a cover, with all or a portion of a bottom region of the drive or drives, or elements thereof, exposed to the ground below, essentially the frame of the header then generally defining the lower bounds of the cavity.

BRIEF DESCRIPTION OF THE DRAWINGS

FIG. 9A is a simplified schematic top view of elements of one of the drives illustrating a pivotal position thereof;

FIG. 9B is a simplified schematic top view of the elements of one of the drives illustrating another pivotal position thereof;

FIG. 9C is another simplified schematic top view of the elements of one of the drives illustrating another pivotal position thereof;

FIG. 9D is another simplified schematic top view of elements of one of the drives illustrating still another pivotal position thereof.

DETAILED DESCRIPTION OF THE INVENTION

Figure 1:
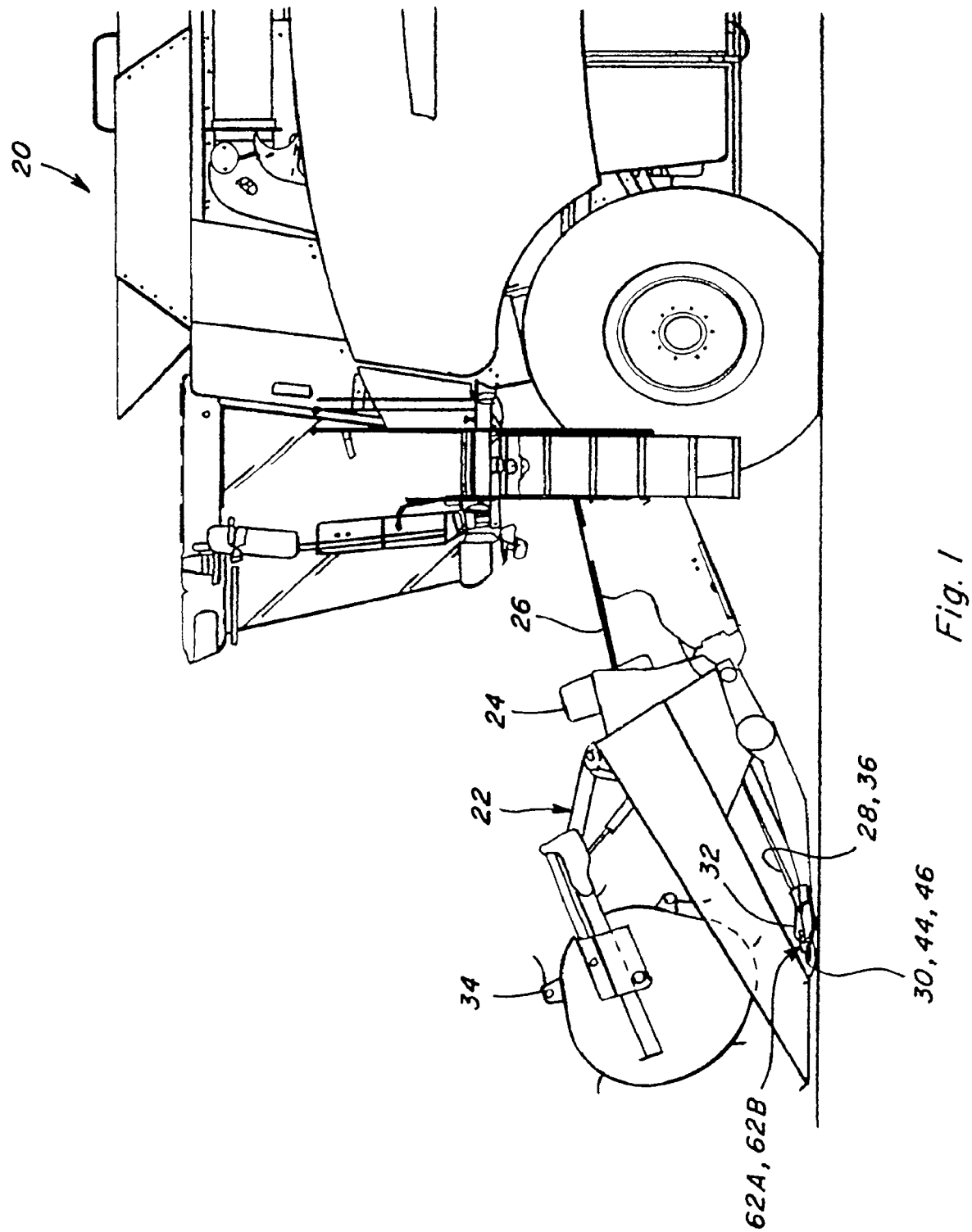
FIG. 1 is a fragmentary side view of a harvester including a header having pivoting action low profile sickle drives according to the invention.
Figure 2:
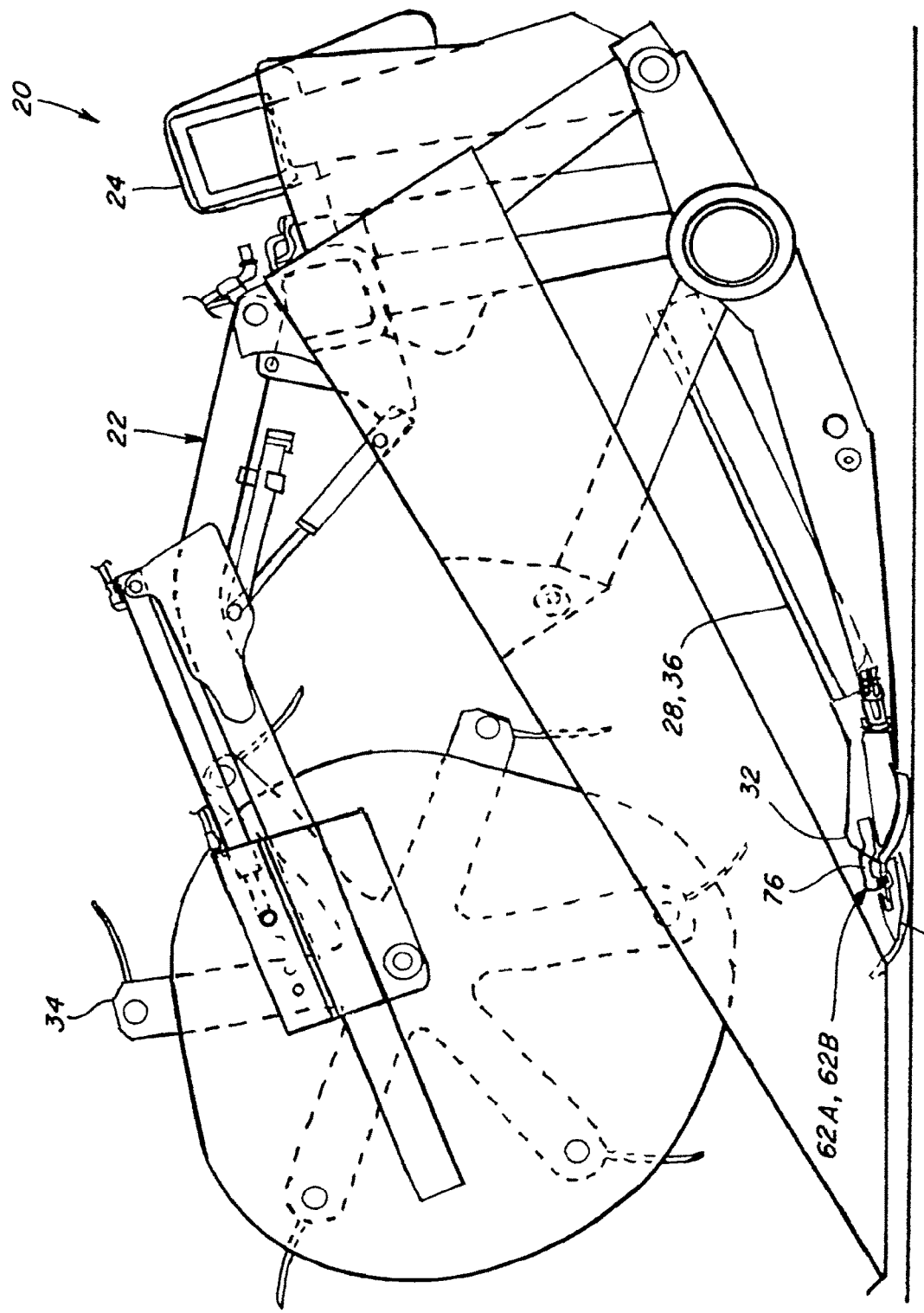
FIG. 2 is an enlarged fragmentary side view of the header and sickle drives of the invention.

Turning now to the drawings wherein preferred embodiments of the invention are shown, in FIGS. 1 through 5, a conventional, well known agricultural cutting machine, which is a combine 20, is shown including a header 22 having low profile pivoting action sickle drives 62A and 62B constructed and operable according to the teachings of the invention. Header 22 is shown supported in the conventional, well-known manner on a forward end 24 of combine 20, and is operable for cutting or severing crops such as, but not limited to, small grains such as wheat and soybeans, and inducting the severed crops into a feeder 26 for conveyance into combine 20 for threshing and cleaning, in the well known manner, as combine 20 moves forwardly over a field.

Header 22 includes a pan or floor 28 which is supported in desired proximity to the surface of the field during the harvesting operation, and an elongate, sidewardly extending sickle 30 along a forward edge portion 32 of floor 28, sickle 30 being operable for severing the plants or crop for induction into header 22, as will be explained. Header 22 additionally includes an elongate, sidewardly extending reel 34 disposed above sickle 30 and rotatable in a direction for facilitating induction of the severed plant material or crops into header 22. Here, header 22 is configured as a draper type, having a system of elongate, flat, sidewardly moving draper belts 36 and 38 having upwardly facing surfaces disposed just rearwardly of forward edge portion 32, operable in cooperation with reel 34 for conveying the severed plant material or crops toward an inlet opening of feeder 26 for induction into combine 20, in the well-known manner.

Figure 3:
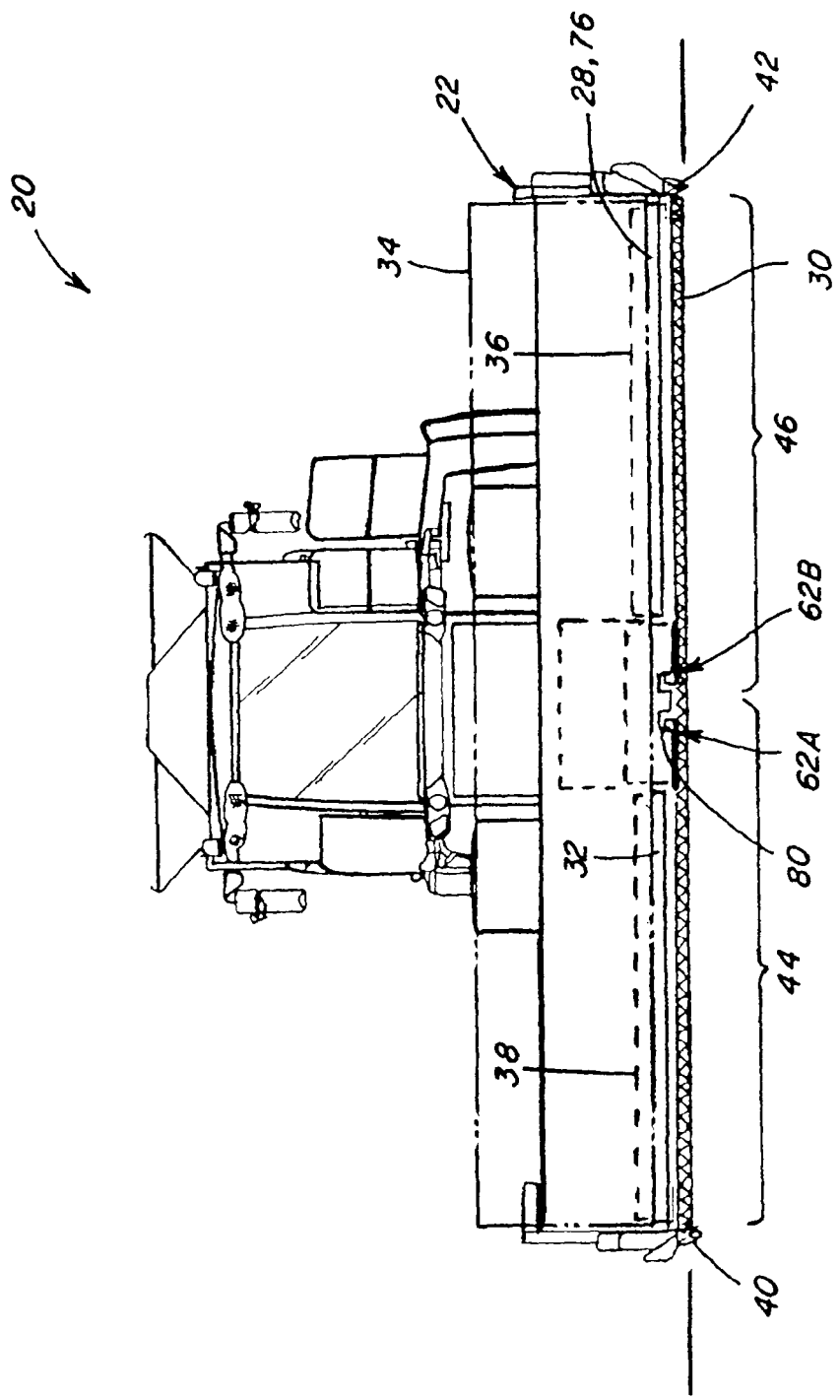
FIG. 3 is a front view of the harvester and header, showing the location of the sickle drives.

Referring more particularly to FIG. 3, sickle 30 extends in a sideward direction along the width of floor 28, between a first side edge portion 40 of the floor, and an opposite second side edge portion 42. Sickle 30 includes an elongate, sidewardly extending first cutter bar assembly 44, and an elongate, sidewardly extending second cutter bar assembly 46 extending in end to end relation to cutter bar assembly 44, cutter bar assemblies 44 and 46 being supported in substantially longitudinally aligned relation adjacent to forward edge portion 32 of floor 28.

Figure 4:
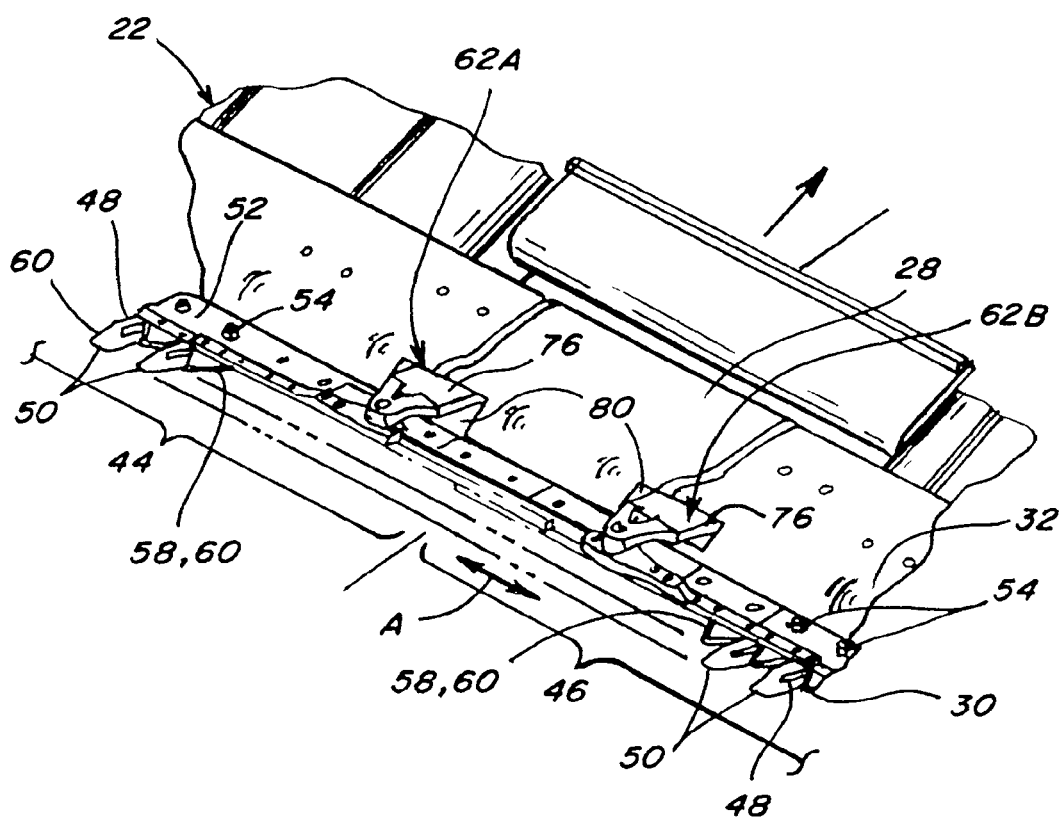
FIG. 4 is a fragmentary perspective view of the header, showing aspects of the sickle drives.
Figure 5:
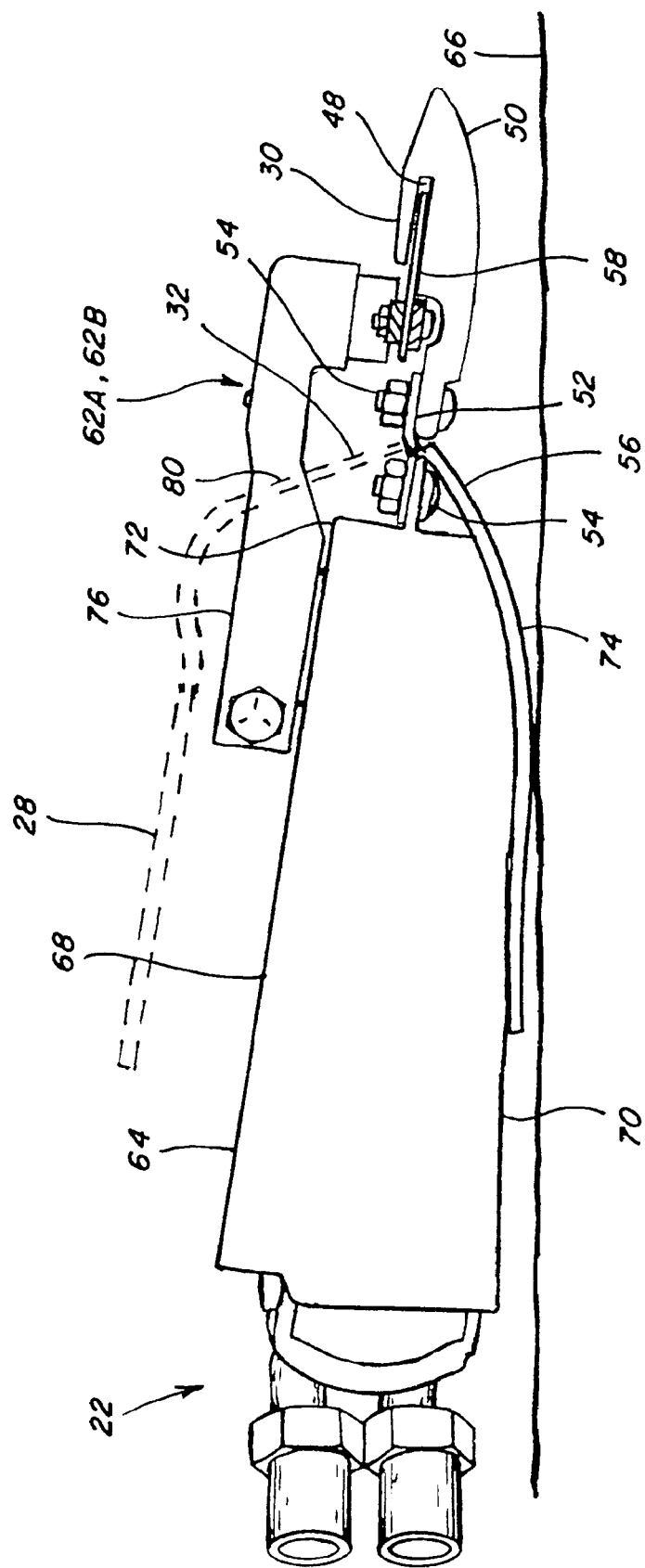
FIG. 5 is an enlarged side view showing aspects of the header, drives, and sickle.

Referring more particularly to FIGS. 4 and 5, cutter bar assemblies 44 and 46 each include a plurality of sidewardly facing aligned slots 48 through a sidewardly extending array of guards 50 which project forwardly from a stationary bar 52 at sidewardly spaced intervals therealong. Stationary bar 52 extends the length of sickle 30 just forwardly of forward edge portion 32 of floor 28, and guards 50 are mounted to bar 52 with fasteners 54. Bar 52, in turn, is mounted to a frame 56 of header 22 adjacent to forward edge portion 32 by fasteners 54, as best illustrated in FIG. 5. Each of cutter bar assemblies 44 and 46 supports an elongate knife assembly 58 for reciprocating longitudinal movement within slots 48, each knife assembly 58 including a row of knife sections including oppositely facing, angularly related knife edges 60 which, in conjunction with adjacent guards 50, effects a shearing or cutting action which severs plant stems and stalks or other material captured between the knives and the guards as the knife sections are reciprocatingly moved sidewardly, as denoted by arrow A in FIG. 4.

As noted above under the Background Art heading, it is desirable to reduce negative effects of the reciprocating sideward motion of knife assemblies 58, including, but not limited to, vibration, fatigue failure, and the like, and also the disadvantages of known structures for effecting the motion, including the need for substantial structure for supporting drive mechanisms on the sides of headers, the increased width of side dividers containing the mechanism, and apparatus for timing drive mechanisms located on opposite sides of a header.

Reduction of these negative effects and disadvantages is achieved according to the present invention by utilizing first and second pivoting action low profile sickle drives 62A and 62B of the teachings of the present invention, for reciprocatingly driving the respective knife assemblies 58. First and second sickle drives 62A and 62B are illustrated in FIG. 1 at a center location on header 22 between side edge portions 40 and 42, although it should be noted that it is contemplated that sickle drives 62A and 62B could alternatively be utilized at other locations on a header, and that multiple sickle drives 62 could be used at multiple locations on a header, as described and illustrated later herein.

First and second sickle drives 62A and 62B are illustrated as packaged together in a low profile common enclosure 64. Enclosure 64 is configured so as to be integrated into or beneath floor 28 of header 22, in, or just rearward of, forward edge portion 32, as best shown in FIG. 5, to facilitate both smooth flow of crop or plant material thereover, and also smooth passage over the ground surface 66 therebelow. In this latter capacity, it can be observed that enclosure 64 is desirably configured to have a tapered profile shape when viewed from the side, preferably including an upper cover 68, and a lower cover 70 to allow disassembly, and which extend generally convergingly toward a forward end 72 of the enclosure. Also preferably, the forward end of lower cover 70 will have an upwardly curving shape, to guide and facilitate the smooth passage over the ground surface and flow of plant material thereabout. It can be observed that forward edge portion 32 of floor 28 has an upwardly curved shape, which combined with the upwardly tapered or curved forward end of enclosure 64, provides header 22 with an overall wedge shaped leading edge profile, which again, facilitates the smooth flow over the ground and of plant material over the front edge of the header. Enclosure can be mounted in any suitable manner, such as by attachment with fasteners to frame or structural elements of header 22.

As shown, upper cover 68 of enclosure 64 is located below forward edge portion 32 of floor 28, which can comprise sheet metal or other suitable material, such that cut plant material will flow over the enclosure without contacting it. Alternatively, upper cover 68 can be integrated into floor 28. Enclosure 64 will be of cast and/or machined metal construction such as steel or aluminum, and upper and lower covers 68 and 70 can be joined together with suitable fasteners or the like. A skid plate 74 can be disposed below at least the forward end, for protection from wear and contact with hard objects such as rocks and the like that may be encountered during operation.

Each of first and second sickle drives 62A and 62B includes a knife arm 76 atop upper surface 68 of enclosure 64 and extending forwardly therefrom. Knife arms 76 pivotally connect to the knife assemblies 58, respectively, and are movable by the respective drive 62A or 62B in a sideward pivoting action that will translate via a pivoting relationship into the above described sideward reciprocating movement, as restrained by the guards 50. Knife arms 76 are preferably the only upwardly externally protruding elements of first and second drives 62A and 62B, the other elements being located within an internal cavity 78 of enclosure 64. Knife arms 76 also preferably project forwardly through slots 80 in forward edge portion 32, to minimize interruption of the plant material flow.

Figure 6:
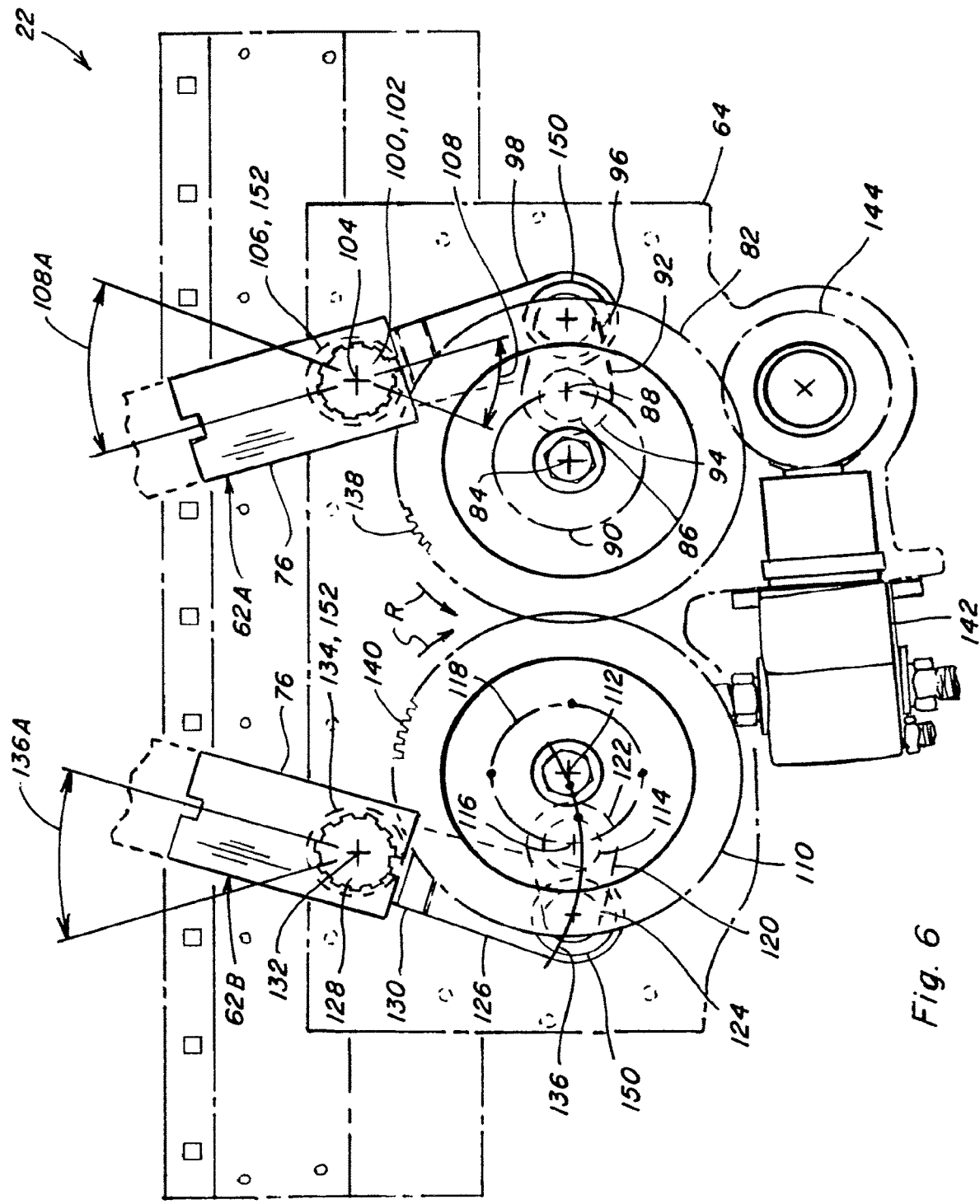
FIG. 6 is a simplified schematic top view of the drives, illustrating internal elements thereof.
Figure 7:
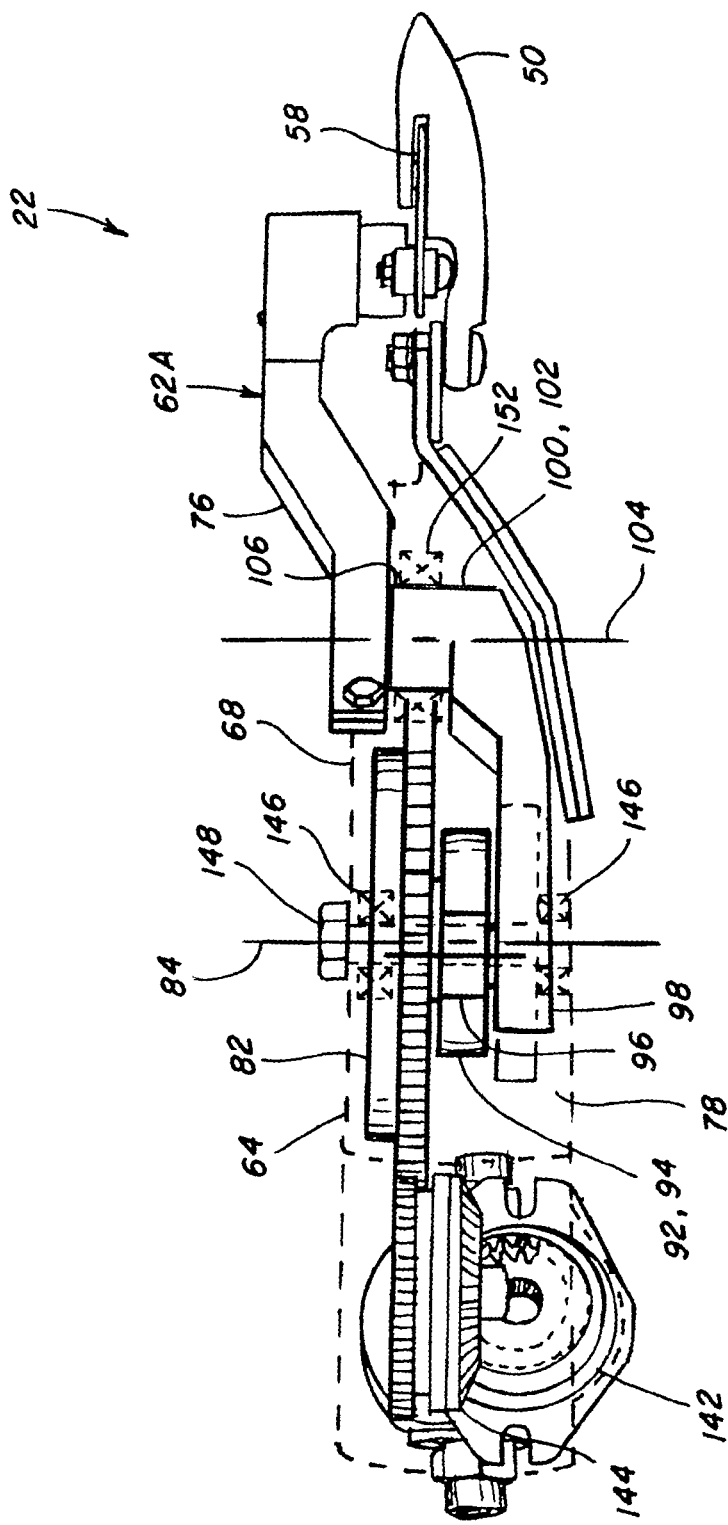
FIG. 7 is a simplified schematic side view of the drives, with an enclosure in dotted lines to show internal elements of one of the drives.
Figure 8:
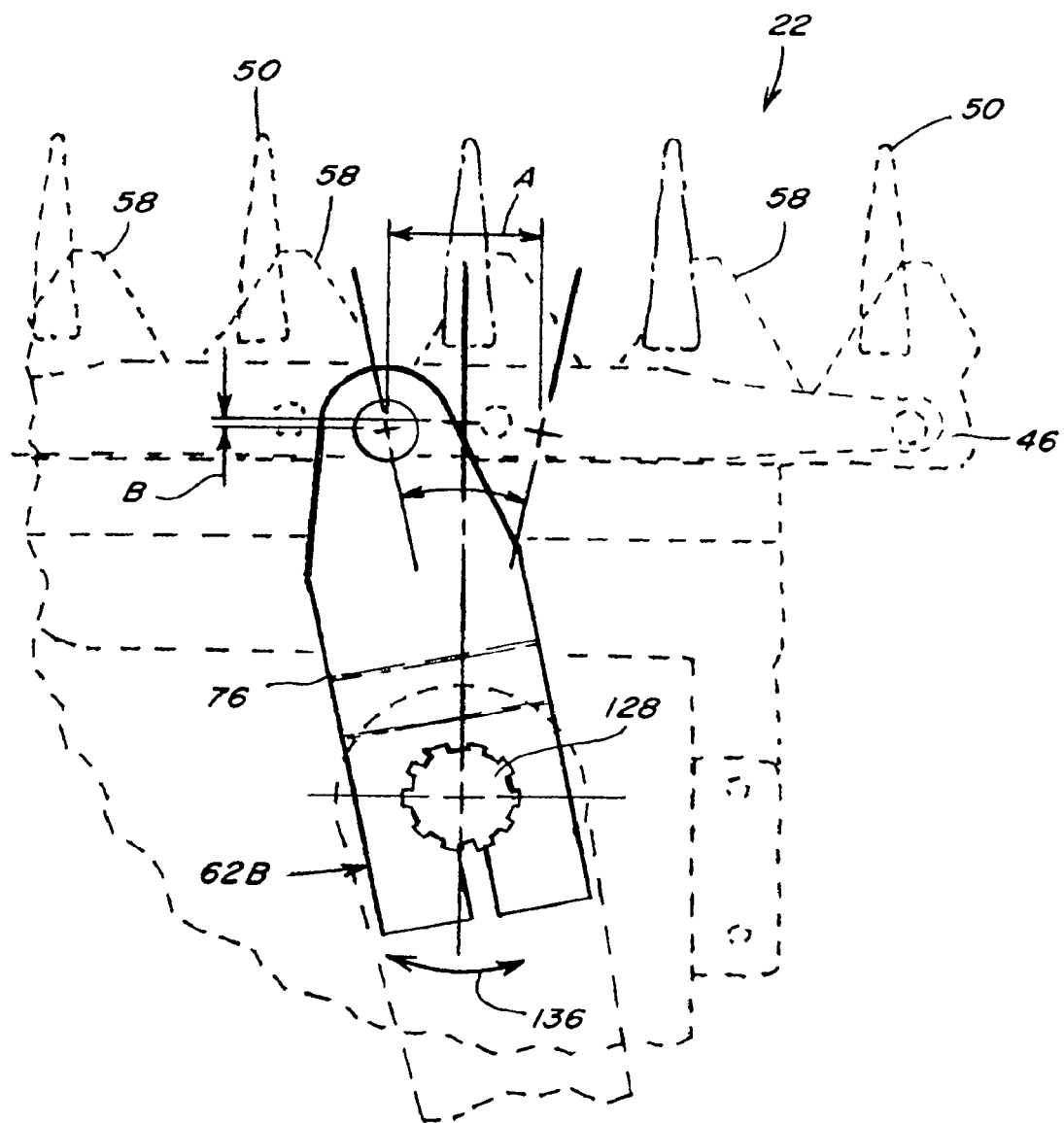
FIG. 8 is a simplified schematic top view of elements of one of the drives and a portion of the sickle, to illustrate a range of pivotal positions thereof.

Referring also to FIGS. 6 and 7, the internal elements of first and second drives 62A and 62B other than knife arms 76 are disposed in side by side relation in an internal cavity 78 of enclosure 64. First and second drives 62A and 62B are each configured as an epicyclic arrangement, including a central rotatable input element, an eccentric element rotatable along an epicyclical orbit about the rotatable input element, and a pivoting drive arm moved by the eccentric element to pivot the knife arm in the side to side direction. More particularly, first drive 62A includes a rotatable first input element 82 supported in an upper region of cavity 78 for rotation about a generally upstanding first rotational axis 84. Drive 62A includes a first eccentric element 86 supported in cavity 78 below first input element 82 for rotation thereby in eccentric relation to first rotational axis 84 about a generally upstanding first eccentric axis 88 laterally offset relative to rotational axis 84, such that eccentric element 86 will follow an epicyclical path 90 about rotational axis 84. Drive 62A includes a first drive arm 92 disposed in cavity 78, having a first end 94 and an opposite second end 96. First end 94 is rotatably connected to eccentric element 86 for rotation therewith along epicyclical path 90 (FIG. 6) about first rotational axis 84. First drive arm 92 extends laterally relative to axis 84 from first end 94 to second end 96. Second end 96 pivotally connects to a pivot arm 98 connected eccentrically to a pivot shaft 100 of a first pivot element 102 supported for rotation about a generally upstanding first pivotal axis 104 therethrough. Pivot shaft 100 extends upwardly through an aperture 106 through upper cover 68 of enclosure 64 and fixedly connects to a knife arm 76, e.g., via a splined connection or the like.

In operation, rotation of first input element 82 as denoted by arrow R, will cause first eccentric element 86 to orbit eccentrically along epicyclical path 90. First end 94 of drive arm 92, because it is connected to first eccentric element 86, will also orbit about epicyclical path 90, while end 96, because it is pivotally connected to pivot arm 98, will only move along a limited arcuate path 108 about pivotal axis 104. Because knife arm 76 is fixedly connected to the upper end of pivot shaft 100, it will be limited in movement to a corresponding arcuate path 108A. Additionally, because the opposite end of knife arm 76 is connected to a knife assembly 58, knife assembly 58 will be reciprocatingly moved sidewardly an amount A (FIG. 4) relative to guards 50, to effect the plant cutting action.

Second drive 62B includes a rotatable second input element 110 supported in an upper region of cavity 78 for rotation about a generally upstanding second rotational axis 112, beside first input element 82. Drive 62B includes a second eccentric element 114 supported in cavity 78 below second input element 110 for rotation thereby in eccentric relation to second rotational axis 112 about a generally upstanding second eccentric axis 116 laterally offset relative to rotational axis 112, such that eccentric element 114 will follow an epicyclical orbital path 118 about rotational axis 112. Drive 62B includes a second drive arm 120 disposed in cavity 78, having a first end 122 and an opposite second end 124. First end 122 is rotatably connected to second eccentric element 114 for rotation therewith about second eccentric axis 116 in eccentric relation to, and about, second rotational axis 112. Second drive arm 120 extends laterally relative to axis 112 from first end 122 to second end 124. Second end 124 pivotally connects to a pivot arm 126 connected eccentrically to a pivot shaft 128 of a second pivot element 130 supported for rotation about a generally upstanding second pivotal axis 132 therethrough. Pivot shaft 128 extends upwardly through an aperture 134 through upper cover 68 of enclosure 64 and fixedly connects to a second knife arm 76, again via a splined connection or the like. Second drive 62B will essentially be a mirror image of first drive 62A.

Referring also to FIGS. 8 and 9A-D, in operation, in the same manner as for drive 62A, rotation of second input element 110 of drive 62B, as illustrated by arrow R, will cause second eccentric element 114 to orbit eccentrically along epicyclical path 118. First end 122 of second drive arm 120, because it is attached to eccentric element 114, will orbit along path 118 about rotational axis 112 while also rotating about eccentric axis 116. This, in combination with the ability of pivot arm 126 and pivot shaft 128 of element 130 to only pivot about pivotal axis 132, results in limited pivotal movement of second end 124 of drive arm 120 and pivot arm 126 along an arcuate path 136 about axis 132. In this regard, the connection of knife arm 76 to knife assembly 58 is preferably a pinned connection such that knife assembly 58, or that portion thereof in proximity to knife arm 76, will also move along the pivotal path, such that some limited fore and aft movement of the knife assembly will occur, as denoted by the distance B in FIG. 8. The relationship between the guards and knife assembly can be configured to allow this. Alternatively, the connection between the knife head and knife assembly can be configured, e.g., slotted connection, to allow some limited fore and aft relative movement, such that the knife assembly only moves sidewardly.

Referring particularly to FIGS. 9A-9D, four positions along epicyclical orbital path 118 about rotational axis 112, of eccentric element 114, eccentric axis 116 and first end 122 of drive arm 120 of drive 62B, resulting from rotation of input element 110 denoted by arrow R, are shown. Also shown are the resulting translated positions of drive arm 120, pivot arm 126, and the attached knife arm 76 about pivot axis 132, for the four positions. This will result in the attached knife assembly being reciprocatingly moved in the above described manner. Movements of corresponding components of drive 62A will be the mirror image of those shown for drive 62B.

It is desired to reciprocatingly move the two knife assemblies 58 simultaneously in opposite sideward directions. To achieve this, first and second drives 62A and 62B are preferably operated in opposite direction, in timed relation. This is preferably accomplished by jointly driving the drives in opposite rotational directions. In the preferred configuration shown, first and second input elements 82 and 110 are connected together via enmeshed gears 138 and 140 which extend therearound, respectively. Alternatively, input elements 82 and 110 could be connected together by a cogged belt, a timing shaft, or the like, and the eccentric axes 88 and 116 offset to provide opposite directional movements of drive arms 92 and 120.

To rotate input elements 82 and 110, a rotatable power source 142 or input is provided, which is preferably an electric or fluid motor, connected in driving relation to one of the input elements 82 or 110 via a gear arrangement 144 or the like. Alternatively, the power source could comprise a shaft, chain or belt drive, as desired. Here, power source 142 is mounted to housing 64 at a large acute angle to the forward direction. This enables accommodating power source 142 in a manner to provide a shorter overall fore and aft extent of the drives.

As a feature of the invention, to provide a relatively thin, flat overall package, input elements 82 and 110, eccentric elements 86 and 114, and drive arms 92 and 120 of drives 62A and 62B are each relatively flat, and the eccentric elements and drive arms are substantially vertically coextensive, to provide vertical compactness, such that drives 62A and 62B are adapted to be unobtrusively positioned below or in the front region of floor 28 of a header, such as header 22, to allow relatively unhindered plant material flow thereover. In this regard, input elements 82 and 110 are each preferably disk or platter shaped elements supported for rotation about axes 84 and 112, respectively by suitable bearings 146 (FIG. 7), the inner races of which are connected to enclosure 64 by threaded fasteners 148 which serve as mounting shafts. This configuration provides input elements 82 and 110 mass to serve as flywheels for the drives. Also, input elements 82 and 110 overlap or are horizontally coextensive with large portions of drive arms 92 and 120, respectively, to facilitate compactness.

Eccentric elements 86 and 114 are fixedly connected to the respective input elements 82 and 110 for rotation therewith. Drive arms 92 and 120 are mounted about the respective eccentric elements 86 and 114 via bearings for rotation thereabout, the eccentric elements and drive arms being held vertically together by threaded fasteners or the like. The opposite ends of arms 92 and 120 connect to pivot arms 98 and 126 via pivot joints 150 which can also include bearings to allow relative rotation or pivoting action. Pivot shafts 100 and 128 are supported for rotation in apertures 106 and 134, respectively, by bearings 152. Upper and lower covers 68 and 70 are fastened together by fasteners at spaced locations therearound. Power source 142 is also attached with fasteners. The splined portions of knife arms 76 and upper ends of pivot shafts 100 and 128, respectively, are held together by fasteners, in a clamping action.

Figure 10:
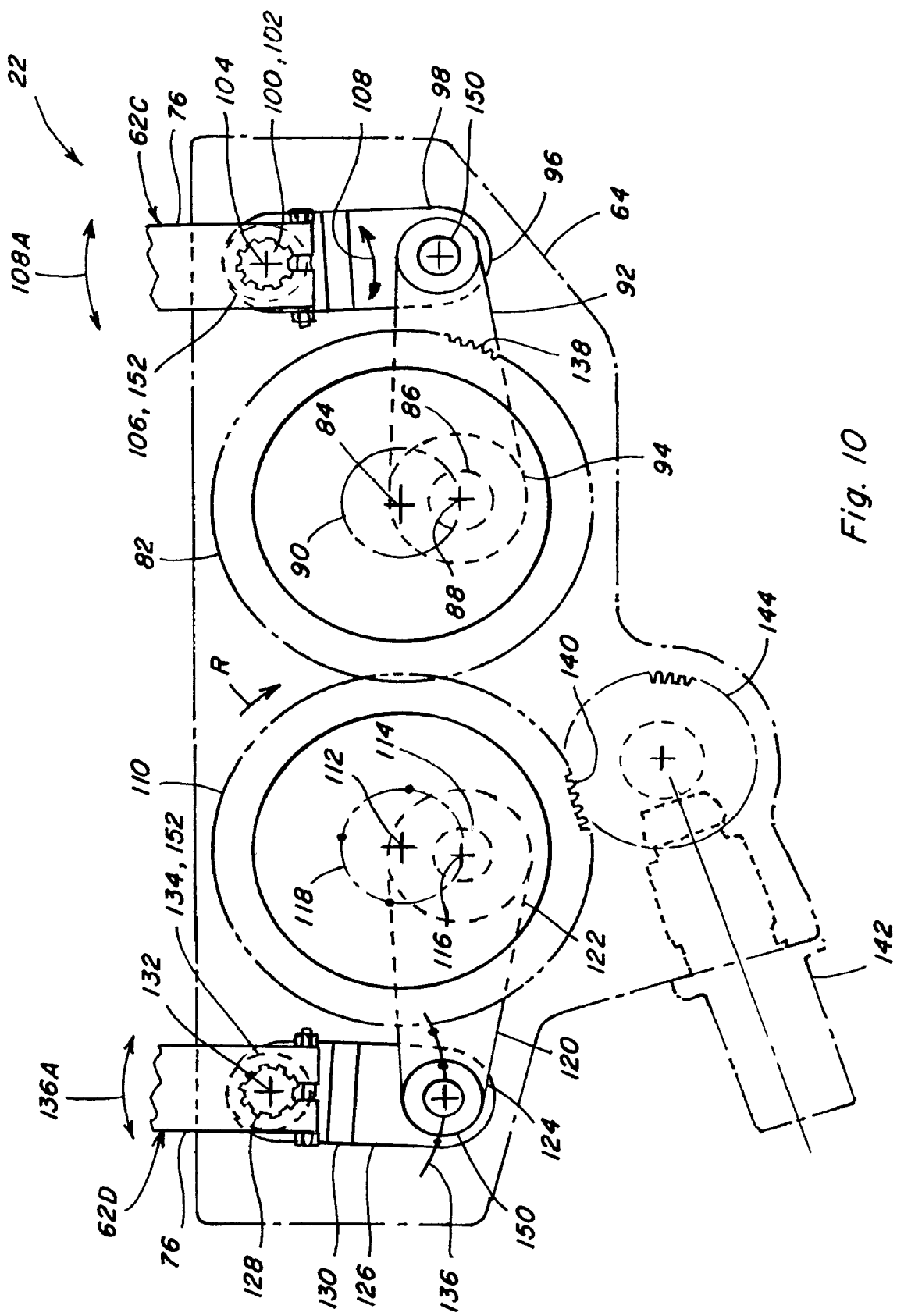
FIG. 10 is a simplified schematic top view of the header including another embodiment of low profile pivoting action sickle drives according to the invention.

Here, it should be noted that the knife arms of the drives of the invention can be oriented in a variety of directions other than the generally forward direction shown in FIGS. 6-8 and 9A-D. A representative different orientation is shown in FIG. 10, by sickle drives 62C and 62D, like parts of drives 62C and 62D, and drives 62A and 62B, being identified by like numbers. Drives 62C and 62D differ from drives 62A and 62B by the orientation of the drive arms in a more sidewardly direction, which also spaces the knife arms 76 farther apart. Each of first and second sickle drives 62C and 62D includes a knife arm 76 atop upper surface 68 of enclosure 64 and extending forwardly therefrom. Knife arms 76 pivotally connect to the knife assemblies in the above described manner, respectively, and are movable by the respective drive 62C or 62D in a sideward pivoting action that will translate via a pivoting relationship into the above described sideward reciprocating movement, as restrained by the guards. Knife arms 76 are the only upwardly externally protruding elements of first and second drives 62C and 62D, the other elements being located within the internal cavity of enclosure 64, to minimize interruption of the plant material flow.

Like with drives 62A and 62B, the internal elements of first and second drives 62C and 62D are disposed in side by side relation in enclosure 64. First and second drives 62C and 62D are each configured as an epicyclic arrangement, including a central rotatable input element, an eccentric element rotatable along an epicyclical orbit about the input element, and a pivoting drive arm moved by the eccentric element to pivot the knife arm in the side to side direction. More particularly, first drive 62C includes a rotatable first input element 82 supported in an upper region of cavity 78 for rotation about a generally upstanding first rotational axis 84. Drive 62C includes a first eccentric element 86 supported in cavity 78 below first input element 82 for rotation thereby in eccentric relation to first rotational axis 84 about a generally upstanding first eccentric axis 88 laterally offset relative to rotational axis 84, such that eccentric element 86 will follow an epicyclical path 90 about rotational axis 84. Drive 62C includes a first drive arm 92 disposed in cavity 78, having a first end 94 and an opposite second end 96. First end 94 is rotatably connected to eccentric element 86 for rotation therewith along epicyclical path 90 about first rotational axis 84. First drive arm 92 extends laterally in a first sideward direction relative to axis 84 from first end 94 to second end 96. Second end 96 pivotally connects to a pivot arm 98 connected eccentrically to a pivot shaft 100 of a first pivot element 102 supported for rotation about a generally upstanding first pivotal axis 104 therethrough. First drive arm 92 can be observed as being largely contained within the horizontal extent of the first input element 82. Pivot shaft 100 extends upwardly through an aperture 106 through upper cover 68 of enclosure 64 and fixedly connects to a knife arm 76, e.g., via a splined connection or the like.

Second drive 62D includes a rotatable second input element 110 supported in an upper region of the cavity of the enclosure for rotation about a generally upstanding second rotational axis 112, beside first input element 82. Drive 62D includes a second eccentric element 114 supported in cavity 78 below second input element 110 for rotation thereby in eccentric relation to second rotational axis 112 about a generally upstanding second eccentric axis 116 laterally offset relative to rotational axis 112, such that eccentric element 114 will follow an epicyclical orbital path 118 about rotational axis 112. Drive 62D includes a second drive arm 120 disposed in cavity 78, having a first end 122 and an opposite second end 124. First end 122 is rotatably connected to second eccentric element 114 for rotation therewith about second eccentric axis 116 in eccentric relation to, and about, second rotational axis 112. Second drive arm 120 extends laterally in a second sideward direction relative to axis 112 from first end 122 to second end 124. Second end 124 pivotally connects to a pivot arm 126 connected eccentrically to a pivot shaft 128 of a second pivot element 130 supported for rotation about a generally upstanding second pivotal axis 132 therethrough. Second drive arm 120 can be observed as being largely contained within the horizontal extent of the second input element 110. Pivot shaft 128 extends upwardly through an aperture 134 through upper cover 68 of enclosure 64 and fixedly connects to a second knife arm 76, again via a splined connection or the like. Second drive 62D will essentially be a mirror image of first drive 62C.

As with drives 62A and 62B, eccentric elements 86 and 114 of drives 62C and 62D are fixedly connected to the respective input elements 82 and 110 for rotation therewith. Drive arms 92 and 120 are compactly mounted about the respective eccentric elements 86 and 114 via bearings for rotation thereabout, the eccentric elements and drive arms being held vertically together by threaded fasteners or the like. The opposite ends of arms 92 and 120 connect to pivot arms 98 and 126 via pivot joints 150 which can also include bearings to allow relative rotation or pivoting action. Pivot shafts 100 and 128 are supported for rotation in apertures 106 and 134, respectively, by bearings 152. To rotate input elements 82 and 110 of drives 62C and 62D, a rotatable power source 142 is provided, which is preferably an electric or fluid motor, located largely in the overall vertical profile of the drive connected in driving relation to one of the input elements 82 or 110 via a gear arrangement 144 or the like. In operation, referring to drive 62D, the eccentric movements of first end 122 of drive arm 120 along the epicyclic path 118 resulting from rotation of input element 110 (arrow R) will translate into pivotal movements of second end 124 of the drive arm, pivot element 130 and knife arm 76 along arcuate path 136. This will result in the attached knife assembly being reciprocatingly moved in the same manner as described above.

As an advantage of the invention, because the two drives are oppositely moving, external forces and resulting vibrations generated by the drives in both the sideward and fore and aft directions, are largely canceled. As another advantage, the configuration of drives 62A-D, and packaging in a single enclosure 64, allows pivot shafts 100 and 128, and also the pivotal connections between the drive arms and pivot arms, to be of relatively large diameter, and the drive arms to be relatively short and light weight, so as to be robust and strong while the drives are compact, both vertically, and horizontally.

Here, it should be understood that according to the invention it is contemplated that the arrangement of elements of drives 62A and 62B can be vertically reversed, such that the input element is on the bottom, if desired or required for a particular application.

In light of all the foregoing, it should thus be apparent to those skilled in the art that there has been shown and described a pivoting action low profile sickle drive. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

The invention claimed is:

1. A sickle drive for an agricultural harvester comprising:
a rotary power source;
a first eccentric element for rotation eccentrically about a first rotational axis and driven by the rotary power source;
a first pivot element supported for rotation about a first pivotal axis and connected to the first eccentric element;
a first pivot arm connected to the first pivot element and mounted for pivotal movement about the first pivotal axis;
a first sickle drive having a first end driven by the first pivot arm and a second end for connection to a sickle; and
a flywheel driven by the rotary power source for common rotation therewith.

2. The sickle drive of claim 1, further comprising:
a second eccentric element for rotation eccentrically about a second rotational axis and driven by the rotary power source;
a second pivot element supported for rotation about a second pivotal axis and connected to the second eccentric element;
a second pivot arm connected to the second pivot element and mounted for pivotal movement about the second pivotal axis; and
a second sickle drive having a first end driven by the second pivot arm and a second end for connection to a sickle.

3. The sickle drive of claim 2, wherein the flywheel is between the first and second eccentric elements.

4. The sickle drive of claim 2, wherein the rotary power source is between the first and second sickle drives.

5. The sickle drive of claim 1, wherein the flywheel overlaps the rotary power source.

6. The sickle drive of claim 1, wherein the flywheel rotates coincidentally with rotary power source.

7. The sickle drive of claim 1, wherein the rotary power source rotates about an axis spaced from the first rotational axis.

8. The sickle drive of claim 1, wherein the flywheel is positioned within an enclosure.

9. The sickle drive of claim 1, wherein the flywheel has an overall width greater than an overall width of the first eccentric element.

10. The sickle drive of claim 1, wherein the flywheel overlaps a path defined by the first eccentric element.

11. A header for an agricultural harvester comprising:
the sickle drive of claim 1; and
a cutter bar extending along a forward end of the header and connected to the sickle drive.

12. The header of claim 11, further comprising a knife assembly operatively connected to the sickle drive and the cutter bar.

13. An agricultural harvester comprising the header of claim 12.

14. An agricultural harvester comprising the sickle drive of claim 1.

15. A sickle drive for an agricultural harvester comprising:
a substantially horizontally disposed rotary power source;
a first eccentric element for rotation eccentrically about a first rotational axis and driven by the rotary power source;
a first pivot element supported for rotation about a first pivotal axis and connected to the first eccentric element;
a first pivot arm connected to the first pivot element and mounted for pivotal movement about the first pivotal axis; and
a first knife arm having a first end driven by the first pivot arm and a second end for connection to a sickle.

16. The sickle drive of claim 15, further comprising:
a second eccentric element for rotation eccentrically about a second rotational axis and driven by the rotary power source;
a second pivot element supported for rotation about a second pivotal axis and connected to the second eccentric element;
a second pivot arm connected to the second pivot element and mounted for pivotal movement about the second pivotal axis; and
a second knife arm having a first end driven by the second pivot arm and a second end for connection to a sickle.

17. The sickle drive of claim 15, wherein a first end of the first pivot arm lies in a first plane and a second end of the first pivot arm is disposed above the first plane.

18. The sickle drive of claim 17, wherein the second end of the first pivot arm is connected to the first end of the first knife arm.

19. A sickle drive for an agricultural harvester comprising:
a substantially horizontally disposed rotary power source;
a gear arranged to be driven by the rotary power source;
a first eccentric element for rotation eccentrically about a first rotational axis and operatively driven by the gear, wherein the gear is arranged substantially parallel to the first eccentric element;
a first pivot arm operably connected to the first eccentric element and mounted for pivotal movement about a first pivotal axis; and
a first knife arm having a first end driven by the first pivot arm and a second end for connection to a sickle.

20. The sickle drive of claim 19, wherein a first end of the first pivot arm lies in a first plane and a second end of the first pivot arm is disposed above the first plane.

21. The sickle drive of claim 20, wherein the second end of the first pivot arm is connected to the first end of the first knife arm.

22. A sickle drive for an agricultural harvester comprising:
a rotary power source;
a first eccentric element for rotation eccentrically about a first rotational axis and driven by the rotary power source;
a first pivot element supported for rotation about a first pivotal axis and connected to the first eccentric element;

a first pivot arm connected to the first pivot element and mounted for pivotal movement about the first pivotal axis, wherein a first end of the first pivot arm lies in a first plane and a second end of the first pivot arm is disposed above the first plane; and a first knife arm having a first end driven by the first pivot arm and a second end for connection to a sickle.

23. A sickle drive for an agricultural harvester comprising:

a rotary power source;

a first eccentric element for rotation eccentrically about a first rotational axis and driven by the rotary power source;

a second eccentric element for rotation eccentrically about a second rotational axis and operatively driven by the first eccentric element;

a first pivot element supported for rotation about a first pivotal axis and connected to the first eccentric element;

a second pivot element supported for rotation about a second pivotal axis and connected to the second eccentric element;

a first pivot arm connected to the first pivot element and mounted for pivotal movement about the first pivotal axis;

a second pivot arm connected to the second pivot element and mounted for pivotal movement about the second pivotal axis;

a first knife arm having a first end driven by the first pivot arm and a second end for connection to a sickle; and a second knife arm having a first end driven by the second pivot arm and a second end for connection to a sickle.

24. The sickle drive of claim 23, wherein the first eccentric element and the second eccentric element are aligned substantially along a single plane.

* * * * *